United States Patent [19]
Jones et al.

[11] 4,403,877
[45] Sep. 13, 1983

[54] SNUBBED ANCHORING APPARATUS

[75] Inventors: John E. Jones, Manhattan Beach, Calif.; Vittorio R. Castelli, Scarsdale, N.Y.

[73] Assignee: Xerox Corporation, Stamford, Conn.

[21] Appl. No.: 372,883

[22] Filed: Apr. 29, 1982

Related U.S. Application Data

[63] Continuation of Ser. No. 138,631, Apr. 8, 1980, abandoned.

[51] Int. Cl.³ ............................................. B41J 19/00
[52] U.S. Cl. .................................. 400/335; 400/320; 267/8 R; 188/380
[58] Field of Search ................ 400/320, 335; 188/380, 188/379; 267/8 R

[56] References Cited
U.S. PATENT DOCUMENTS

| | | | |
|---|---|---|---|
| 2,358,672 | 9/1944 | Vartia | 188/380 |
| 2,736,393 | 2/1956 | O'Connor | 188/380 |
| 2,837,175 | 6/1958 | Schweitzer | 188/379 |
| 3,780,207 | 12/1973 | Crosby et al. | 188/380 |
| 4,106,412 | 8/1978 | Farris et al. | 267/8 R |
| 4,203,680 | 5/1980 | Mitrovich | 400/320 |
| 4,208,141 | 6/1980 | Jagger | 400/335 |
| 4,325,541 | 4/1982 | Korosladanyi et al. | 267/8 R |

Primary Examiner—William Pieprz
Attorney, Agent, or Firm—Leonard Zalman

[57] ABSTRACT

A flexible force transmitting member biasing arrangement consisting of a snubbing device and a spring. The arrangement functions to permit a flexible force transmitting member attached to it to undergo a significant amount of movement (due to the force exerted by the spring) at very slow rates but prevents the flexible force transmitting member from undergoing substantial movement at high rates attendant with high frequencies of motion. A preferred form of the snubbing device is a dashpot.

3 Claims, 7 Drawing Figures

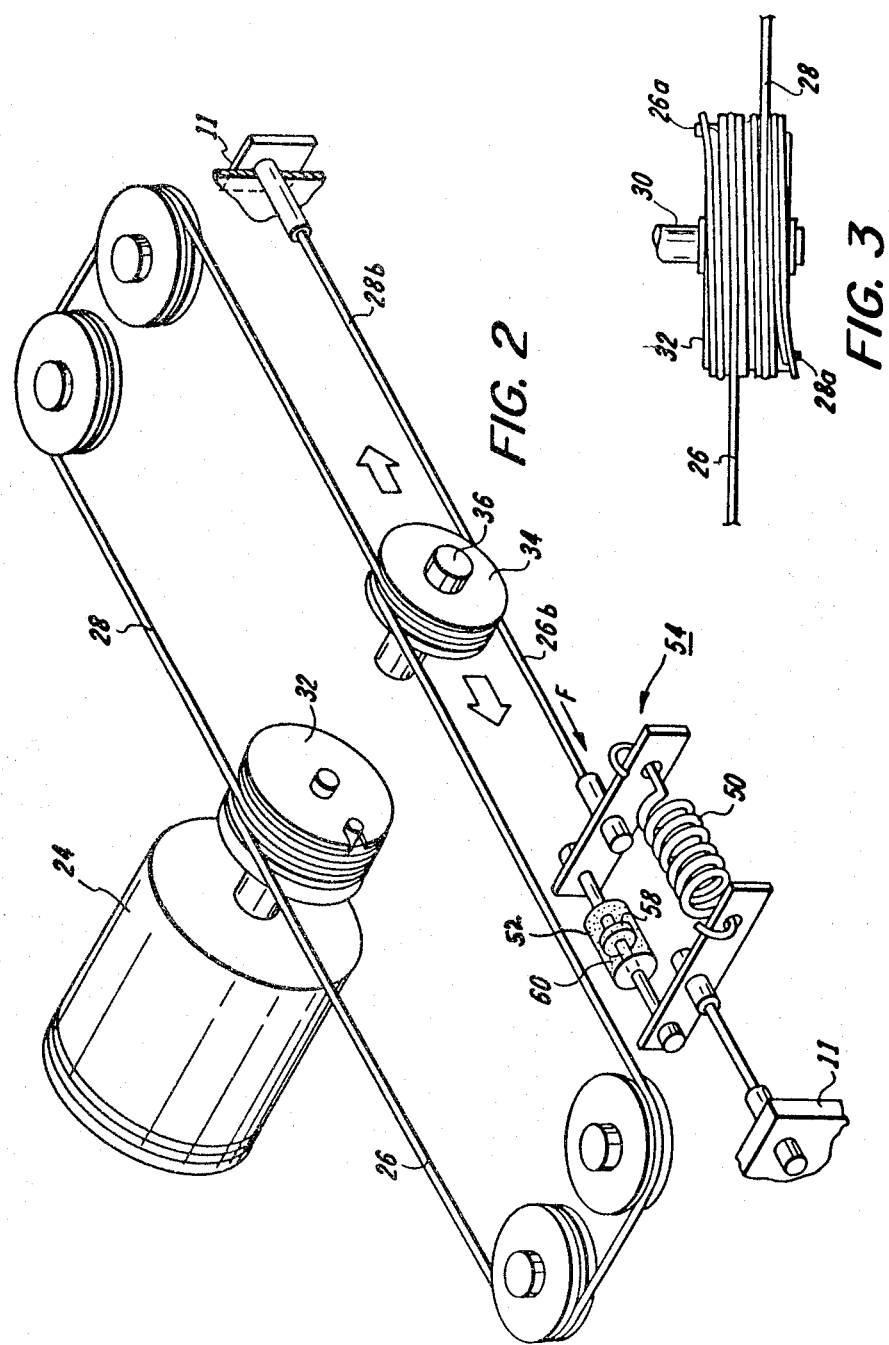

SNUBBED ANCHORING APPARATUS

This is a continuation of application Ser. No. 138,631, filed Apr. 8, 1980, now abandoned.

BACKGROUND OF THE INVENTION

Electric typewriter/printer carriages are often driven by means of a motor acting through a system of two opposing cables operating in parallel, such as disclosed in U.S. Pat. No. 3,872,960. One end of each cable is anchored rigidly to the motor hub. The other end of a first of the cables is anchored rigidly to the typewriter/printer frame while the other end of the second of the cables is connected in series with a spring which tensions that cable to the typewriter/printer frame. The series spring arrangement is utilized to compensate for axial changes in length of the cables due to thermal, aging, and repeated high speed loading effects on the cables such that constant cable tension is maintained.

In cable drive systems, it is desired that the connections of the cables to the carriage and the motor hub appear mechanically stiff or rigid. A drawback of the described series spring arrangement is that the presence of the spring nearly completely eliminates the stiffness of the second cable in the connection of the carriage to the motor hub with consequent deterioration of carriage horizontal registration. A known arrangement which attempts to eliminate that drawback utilizes a non-rotating pulley around which the second cable is wrapped a fraction of a turn before reaching the spring. That arrangement is effective in restoring the apparent stiffness of the second cable but has the disadvantage of introducing a large uncertainty in the value of the tension applied by the second cable. Thus, there is a need for a spring biased cable tensioning arrangement which provides constancy in the value of the mean tension applied to the cables, and cable anchoring that appears perfectly rigid against high frequency load variations.

SUMMARY OF THE INVENTION

In accordance with the invention, the drawbacks of spring biased cable arrangements of the prior art are eliminated by an arrangement consisting of a snubbing device and a spring. The arrangement functions to permit a cable attached to it to undergo a significant amount of movement (due to the force exerted by the spring) at a very slow rates but prevents the cable from undergoing substantial movement at the high rates attendant with the high frequencies of carriage motion. A preferred form of the snubbing device is a dashpot which is a viscous fluid containing device that produces a force in response to and approximately proportional to the rate at which it is moved.

Since the axial changes in length of the drive cables due to thermal, aging, and repeated high speed loading effects occur over a long period of time, compensation by means of movement of one of the cables at very slow rates will provide the desired constant cable tension. By utilizing a snubber device that permits substantially no movement at high rates, the snubber/spring arrangement produces the desired result of making the anchoring of both cables appear perfectly rigid at the very high frequencies associated with carriage movement. The absolute value of the frequency of carriage movement is unimportant as long as the high rates are at least an order of magnitude greater than the slow rates.

BRIEF DESCRIPTION OF THE DRAWINGS

FIG. 2 is a perspective view of a portion of the printer of FIG. 1;

FIG. 3 is an enlarged plan view of a component of the printer of FIG. 1;

DETAILED DESCRIPTION OF THE INVENTION

Figure 1:
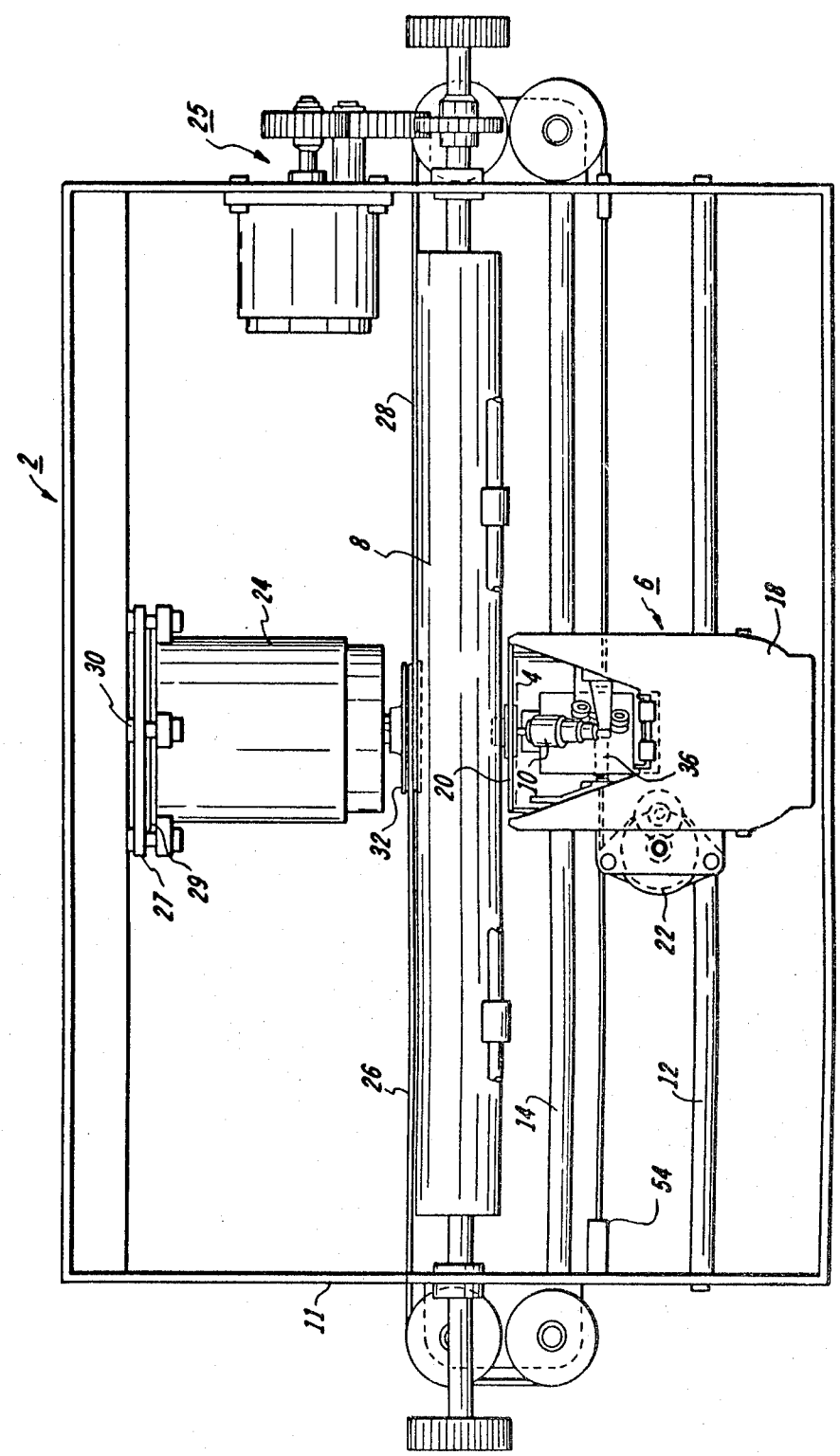
FIG. 1 is a plan view of a printer embodying the present invention.

Referring first to FIG. 1, there is illustrated on overhead view of a typewriter/printer 2 in which the concept of the present invention can be utilized. A print wheel 4 supported by a carriage 6 is utilized in conjunction with a platen 8 to record information on a record medium. Print wheel 4 can be of the type having a number of radially extending spokes with alphanumeric elements at the periphery of the spokes. Printing occurs when a hammer 10 impacts a particular alphanumeric element which has been previously positioned.

Carriage 6 is mounted for linear movement on parallel rods 12 and 14. In addition to print wheel 4 and hammer 10, carriage 6 includes a ribbon cartridge 18 having an inked ribbon 20 driven by a stepping motor 22. Carriage 10 is intermittently transported to various printing positions along the line of printing by a motor 24 acting in conjunction with cable segments 26 and 28. Motor 24 is part of a servo control system including conventional transducer elements 27 and 29 mounted at one end of a shaft 30. The other end of shaft 30 supports a motor hub 32 having a grooved rim. Adjustment of the vertical position of each line of printing is accomplished in a conventional manner by a motor-gear arrangement 25.

Referring now to FIG. 2 cable segments 26 and and 28 act in conjunction with rotation of hub 32 to effect movement of carriage 6 to the left and right via a dual grooved pulley 34 which is rigidly coupled to carriage 6 by an axle 36. Specifically, cable segment 26 is wrapped in a first direction around one of the grooves of pulley 34 and one of its ends 26a is wrapped around the inner portion of the grooved rim of hub 32 and rigidly connected thereto as shown in FIG. 3, whereas cable segment 28 is wrapped in the opposite direction around the other groove of pulley 34 and one of its ends 28a is wrapped around the outer portion of the grooved rim of hub 32 and rigidly connected thereto, as also shown in FIG. 3. The other end 28b of cable segment 28 is rigidly fastened to the frame 11 in a conventional manner.

In accordance with the invention, end 26b of cable 26 is coupled to frame 11 by an arrangement 54 consisting of a spring 50 connected functionally in parallel with a snubber device, preferably a dashpot 52. As used herein, a dashpot denotes a viscous fluid containing device that produces a force in response to and approximately proportional to the rate at which it is moved. Specifically, in relation to FIG. 2, the large area element 58 of dashpot 52 can undergo very slow rates of movement through viscous material 60 in response to long acting applied force but cannot undergo rapid rates of movement through material 60 in response to rapid acting applied forces and appears as a perfectly rigid structure in response to such rapid acting applied forces.

As noted, thermal, aging and high speed loading effects on the cables may cause long term axial changes in length of the cables and an undesired change in cable tension. Such long term changes in length are compensated for by the force F exerted on cable segment 26 by the action of tensioned spring 50. Since the large area element 58 of dashpot 52 can undergo very slow rates of movement through viscous material 60 in response to force F, dashpot 52 will not prevent spring 50 from compensating for long term changes in length of the cables and accordingly constant mean cable tensioning is achieved by arrangement 54. However, since dashpot 52 will not permit rapid rates of movement in response to rapid force changes, such as those associated with the high frequency tensioning of cable segments 26 and 28 due to the high frequency movement of carriage 6 as driven by motor 24, the anchoring of cable end 26b has the desired rigid appearance in relation to rapid force changes. In other words, the spring/dashpot arrangement 54 will appear to function as if it were only a spring in relation to very slow rates of movement, i.e., the spring 50 dominates for slow rates of movement, but will appear to function as if it were only a rigid structure of high rates of movement, i.e., the dashpot 52 dominates for high rates of movement.

The spring/dashpot arrangement 54 shown functionally in FIG. 2 can be implemented by a great number of specific structures. One exemplary structure is the piston-in-cylinder arrangement 54a shown in FIG. 4. Cable segment 26 passes through an aperture in a cylinder 62 which is rigidly connected to frame 11. End 26b of cable segment 26 is connected to a round piston plate 58a having a diameter less than the internal diameter of cylinder 62. A tensioned spring 50 is connected to cylinder 62 and plate 58a, whereby a force F is applied to cable 26. The interior of cylinder 62 is filled with a very viscous material 60a such as, for example Dow Corning E-33969 Bouncing Putty having an apparent viscosity of approximately a few million centipoise. Due to the very high viscosity of material 60a, the radial clearance between plate 58a and the inner wall of cylinder 62 can be large, on the order of 1/16 inch. Also, the length of cylinder 62 and the positioning of plate 58a within cylinder 62 are such as to permit plate 58a to travel on the order of ¼ inch in the direction of cable lengthening for the reason set forth and on the order of ⅛ inch in the direction of cable shortening such as could occur in low temperature environment operation.

Figure 4:
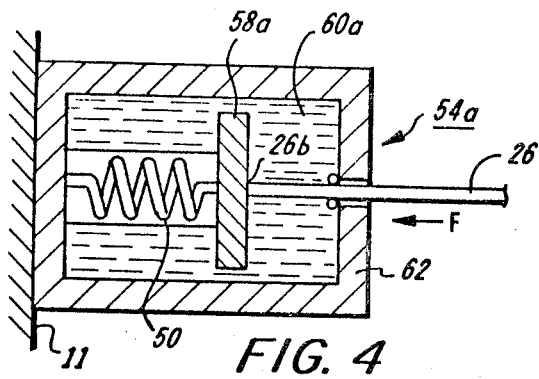
FIGS. 4-7 are views of specific embodiments of a component of the printer of FIG. 1.

The spring/dashpot arrangement of FIG. 4 was tested in a commercially available typewriter and was found to completely eliminate cable end oscillations due to carriage movement (which would have 0.006"–0.008" amplitude variations at frequencies of approximately 60 cycles/sec. when conventionally anchored). Motion of the piston plate 58a under a ten (10) pound spring load was measured to be 0.004" per minutes at ambient temperature when not restrained by the cable.

The bouncing putty referred to in relation to FIG. 4 as a suitable very high viscosity material 60 is a dilatant material which means that its apparent viscosity increases with shear rate, a property which enhances its performance in the described snubber application. Other suitable materials having dilatant properties are lightly crosslinked long chain polymer systems. However, materials having dilatant properties are not essential for use as material 60 and any fluid having a suitable high viscosity such as, for example, silicone fluids and mineral oils could be used. High viscosity materials are preferred because they will permit structures with greater component clearances. Whatever the variation of viscosity with temperature of material 60, the spring/dashpot arrangement 54 can be easily designed to operate over a very large range due to the fact that the exact value of the 'recovery time' is typically not important. By 'recovery time' it is meant the longest period of tension variations that are allowed to occur. In application to a typewriter/printer, the typical recovery time would be longer than a second and shorter than several hours.

Figure 5:
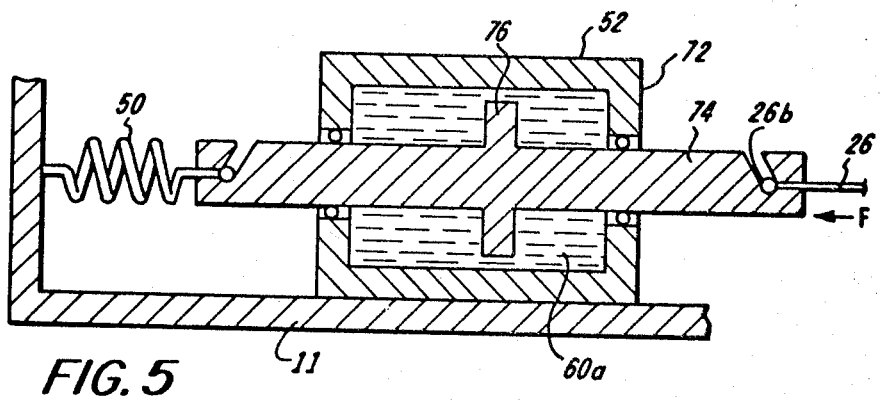

Another exemplary structure of the spring/dashpot arrangement 54 is shown in FIG. 5 in which dashpot 52 includes a stationary enclosure 72 through which passes a rigid member 74 having an enlarged piston plate portion 76. Enclosure 72 contains a very viscous material 60a. One end of member 74 is connected to end 26b of cable 26 and the other end of member 74 is connected to a spring 50 which is tensioned via its connection to frame 11. The structure of FIG. 5 functions in a manner similar to the structure of FIG. 4, permitting only very slow movement of plate portion 76 through viscous material 60a and hence only very slow movement of end 26b of cable 26.

Figure 6:
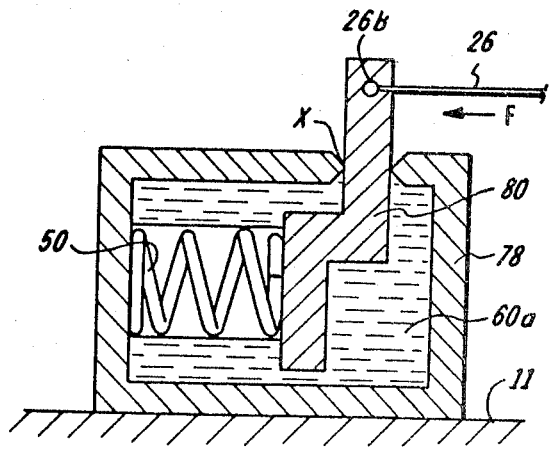

In the two exemplary embodiments of the invention previously described the spring 50 was under tension. Embodiments of the invention in which the spring 50 is in compression are also contemplated, such as shown in FIG. 6 in which a stationary enclosure 78 contains a very viscous material 60a. An angled member 80 has a portion within enclosure 78 and a portion to which cable end 26b is connected. A spring 50 is held in compression between a wall of enclosure 78 and a portion of angled member 80. The structure of FIG. 6 will permit only very slow pivoting about point "X" of angled member 80 through viscous material 60a and hence only very slow movement of end 26b of cable 26.

Figure 7:
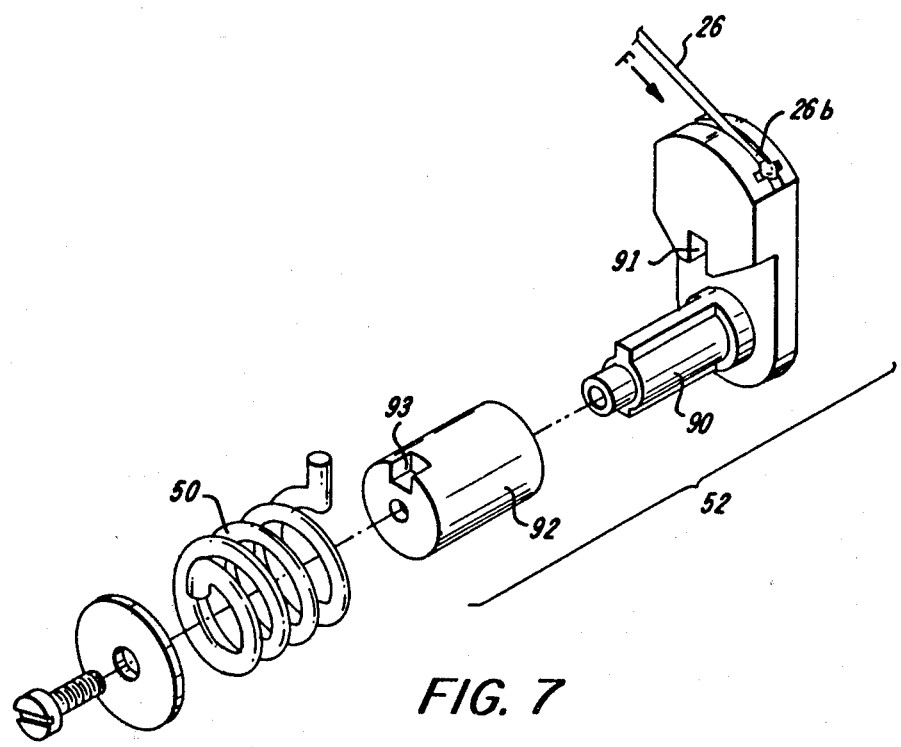

The exemplary embodiments of the invention previously described have included substantially linear movement dashpots. Use of rotary dashpots is contemplated also, as shown in FIG. 7 in which the spring/dashpot arrangement is shown in a telescoping schematic. Blade portion 90 of dashpot 52 fits within a stationary portion 92 which is filled with very viscous material 60a. Spring 50 is secured within slot 91 and slot 93 in such a manner that a clockwise torsional force exists which applies a force F to cable end 26b. Viscous fluid 60a will permit blade portion 90 to move through it at only very slow rates and hence only very slow movement of cable end 26b can occur.

In describing the invention, cables have been referenced as the members used to transmit forces for achieving carrige movement. Other flexible force transmitting members connected so as to achieve carriage drive can be coupled to the described snubbed anchoring apparatus, such other flexible force transmitting members include thin bands, string, rope, chain, and thin rods, all of which deform when a force is applied in compression.

Although the invention has been described in relation to a cable drive system for the carriage of a typewriter/printer, it can be used with any flexible element control system requiring tensioning. For example, it can be used in systems where cable drive is provided to carriages carrying optical elements, writing styli, ink jet nozzles, high intensity light emitting devices, and where cables are used as components of drive units such as aircraft control cable systems or any linear on non-linear actuator with depressable distortable couplings.

What is claimed is:

1. In an apparatus including a flexible force transmitting member and a stationary member, characterized in that an end of the flexible force transmitting member is connected to the stationary member by connector apparatus which maintains a substantially constant tension on said flexible force transmitting member, said connector apparatus consisting of a snubbing device containing a high viscosity material and a spring, the snubbing device being connected between the spring and the flexible force transmitting member such that the spring exerts a force along the length of said force transmitting member at all times whereby the tension on said force transmitting member remains substantially constant.

2. In an apparatus including a flexible force transmitting member and a stationary member, characterized in that an end of the flexible force transmitting member is connected to the stationary member by means which maintains a substantially constant tension on said flexible force transmitting member, said means including a high viscosity material-containing snubbing device and a spring, said snubbing device coupling said spring to said flexible force transmitting member, said means functioning (1) as a soft connector in relation to slow rates of movement of the flexible force transmitting member and (2) as a rigid connector in relation to rapid rates of movement of the flexible force transmitting member, whereby the tension on said force transmitting member remains substantially constant.

3. In an apparatus including a flexible force transmitting member and a stationary member, characterized in that an end of the flexible force transmitting member is connected to the stationary member by means which maintains a substantially constant tension on said flexible force transmitting member, said means including a high viscosity material-containing snubbing device and a spring, said snubbing device coupling said spring to said flexible force transmitting member, said means functioning to permit the end of the flexible force transmitting member to undergo low rates of movement but not high rates of movement whereby said constant tensioning is achieved.

* * * * *